UNITED STATES PATENT OFFICE.

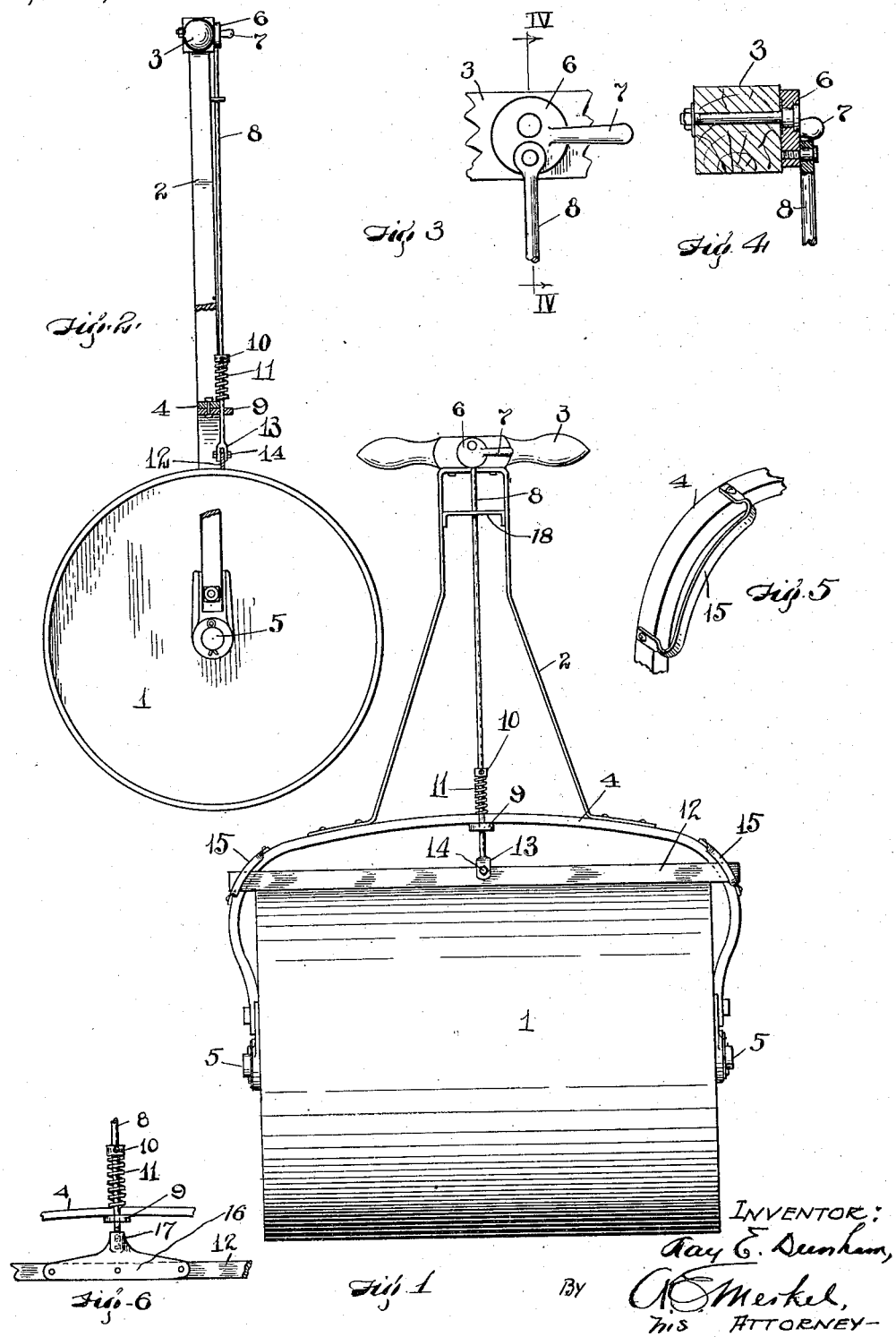

RAY E. DUNHAM, OF BEREA, OHIO, ASSIGNOR TO THE DUNHAM COMPANY, OF BEREA, OHIO, A CORPORATION OF OHIO.

COMBINED SCRAPER AND HANDLE-LOCK FOR LAWN-ROLLERS.

1,218,635.   Specification of Letters Patent.   Patented Mar. 13, 1917.

Application filed May 27, 1916. Serial No. 100,307.

*To all whom it may concern:*

Be it known that I, RAY E. DUNHAM, a citizen of the United States, resident of Berea, county of Cuyahoga, and State of Ohio, have invented a new and useful Improvement in Combined Scrapers and Handle-Locks for Lawn-Rollers, of which the following is a specification, the principle of the invention being herein explained and the best mode in which I have contemplated applying that principle, so as to distinguish it from other inventions.

My invention relates to lawn rollers, its object being to provide a lawn roller with means for scraping or cleaning the cylindrical surface of the drum, which means may incidentally be used as a lock for the handle.

Said invention consists of means hereinafter fully described and particularly set forth in the claims.

The annexed drawing and the following description set forth in detail certain means embodying my invention, the disclosed means, however, constituting but one of various mechanical forms in which the principle of the invention may be employed.

In said annexed drawing:—

Figure 1 represents a front elevation of a lawn roller embodying my invention.

Fig. 2 represents a side elevation with portions of the handle broken away and showing a part of the latter in vertical section.

Fig. 3 represents a detail view on an enlarged scale, showing the manually operable eccentric used for actuating the scraper-rod.

Fig. 4 represents a section taken upon the plane indicated by line IV—IV in Fig. 3.

Fig. 5 represents a detailed perspective of a portion of the transverse member of the handle to which is attached one of the two guides which are provided for the ends of the scraper-bar.

Fig. 6 represents a detail front elevation of a modified or alternative form of scraper-bar connection.

The illustrated embodiment of my invention comprises a roller of any desired construction consisting of a cylindrical drum 1, an oscillatory arm 2, the latter being provided with a wooden grip 3 and a transverse member 4 which carries the bearings for receiving the journals formed by the ends of the axle 5.

Mounted upon the grip is an oscillatory eccentric 6 provided with a handle 7. Articulating with this eccentric is the upper end of a rod 8 which extends toward the drum and passes through a guide-member 9 which is secured to the transverse member 4, as shown in Figs. 1 and 2. Adjustably secured to the rod 8 is a collar 10 and between the latter and the transverse member 4 is a coil-spring 11, the latter being in a compressed condition when the rod is in a position which has been imparted to it by its actuation toward the drum. This spring tends to actuate the rod away from the latter. Connected with the other end of the rod 8 is a transverse scraper-bar 12, the connection being in the form shown in Fig. 1, made so that the bar may oscillate slightly, a fork 13 being provided at the end of the rod and connected with the bar by means of a suitable pin 14 passing through the fork and bar, as will be readily understood. A slight amount of oscillation is therefore permitted the scraper-bar so that it may adjust itself to the drum's surface. Two U-shaped members 15 are secured to opposite sides of the transverse members 4 and form guides into which the ends of the bar 12 project. The parts are so arranged that when the eccentric is in the position shown in Figs. 1 and 3, in which the axes of the eccentric pin and the pivotal axis of the outer end of the rod 8 and eccentric are in a line substantially perpendicular to the axis of the drum, the scraper-bar 12 will be in engagement with the cylindrical surface of the latter. In this position it will be seen that the handle will be locked with reference to the drum and may therefore be given an upright and hence a convenient position when the roller is not in use, as will be readily understood by those skilled in the art. This lock being provided, the weights which are ordinarily required to impart this position to the handle, may be dispensed with, if desired.

When the roller is in use, and it is not desired to take advantage of the function of the scraper, the eccentric is thrown into a position which will permit the spring 11 to throw the scraper-bar away from and hence out of engagement with the drum. When it is desired to use the scraper, the handle 7 is moved so as to bring the scraper-bar into engagement with the material to be removed from the surface of the drum. Under these conditions it will be noted that the drum is rotating and where the substance to be removed, such as earth, is unevenly distributed upon the drum's surface, the force exerted against the scraper-bar will not be evenly distributed, and may be more or less upon either side of the center. This tends to oscillate the scraper-bar upon an axis coinciding with the axis of the rod 8. This tendency is, however, counteracted by the guides 15, as will be readily understood. The resisting force applied to the scraper-bar, and when it varies as above described, also tends to oscillate and will oscillate the same bar upon the axis of the pin 14. This permits the bar to give at the desired point and hence facilitates the operation of scraping, as will be readily understood.

This oscillating feature of the bar 12 may, however, be dispensed with and the connection with the lower end of rod 8 made rigid, as shown in Fig. 6. In this case, a casting 16 is provided riveted to the bar 12, and having an internally threaded boss 17 into which the lower end of rod 8 is screwed.

Instead of connecting the upper end of said rod 8 with the eccentric as described, said upper end may be caused to merely frictionally engage the peripheral surface of the eccentric, as shown in Figs. 1 and 2, the spring 11 maintaining such engagement. In this case it would be advisable to provide an additional guiding member, such as 18, Fig. 1, for properly holding the upper end of said rod 8, as will be understood.

Having fully described my invention, what I claim and desire to secure by Letters Patent is:—

1. In a land roller, the combination of a drum; an oscillatory handle mounted upon the latter; a scraper mounted upon said handle and adapted to be moved into and out of the vicinity of the drum; and means for locking said scraper in its engaging position, whereby it may be caused to form a lock for the said handle.

2. In a lawn roller, the combination of a drum; an oscillatory handle mounted upon the latter; a manually operable eccentric mounted upon said handle; a rod having one end articulating with said eccentric and extending toward the roller drum; a scraper bar connected with the opposite end of said rod and extending substantially parallel with the drum's axis, the length of said rod being such that said scraper bar may be caused to engage the surface of said drum.

3. In a lawn roller, the combination of a drum; an oscillatory handle mounted upon the latter and including a transverse member; a manually operable eccentric mounted upon said handle; a rod having one end articulating with said eccentric and extending toward the cylindrical drum and through a guide in said transverse member; a collar secured to said rod; a coil-spring located intermediately of said collar and said transverse member and tending to actuate the rod away from the drum; and a scraper bar connected with the other end of said rod, the latter being of a length such that said scraper bar may be caused to engage or disengage the cylindrical surface of said drum.

Signed by me, this 17th day of May, 1916.

RAY E. DUNHAM.

Copies of this patent may be obtained for five cents each, by addressing the "Commissioner of Patents, Washington, D. C."